Oct. 10, 1961    E. C. CAVE    3,003,664
MATERIAL APPLYING IMPLEMENT
Filed June 1, 1959    2 Sheets-Sheet 1
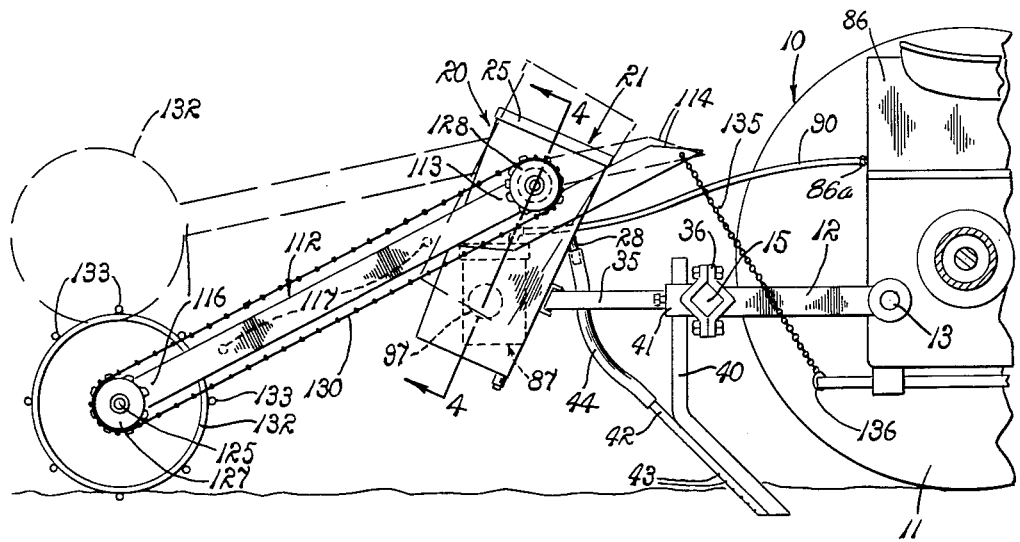
FIG. 1.
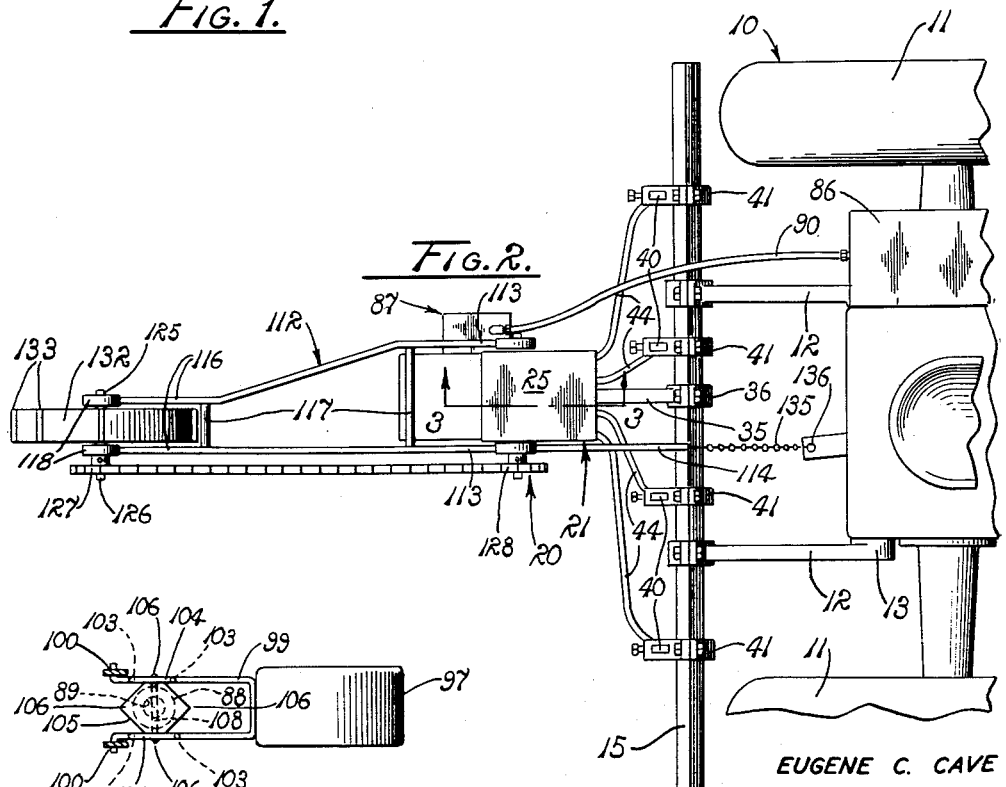
FIG. 2.
FIG. 7.
EUGENE C. CAVE
INVENTOR
HUEBNER & WORREL
ATTORNEYS

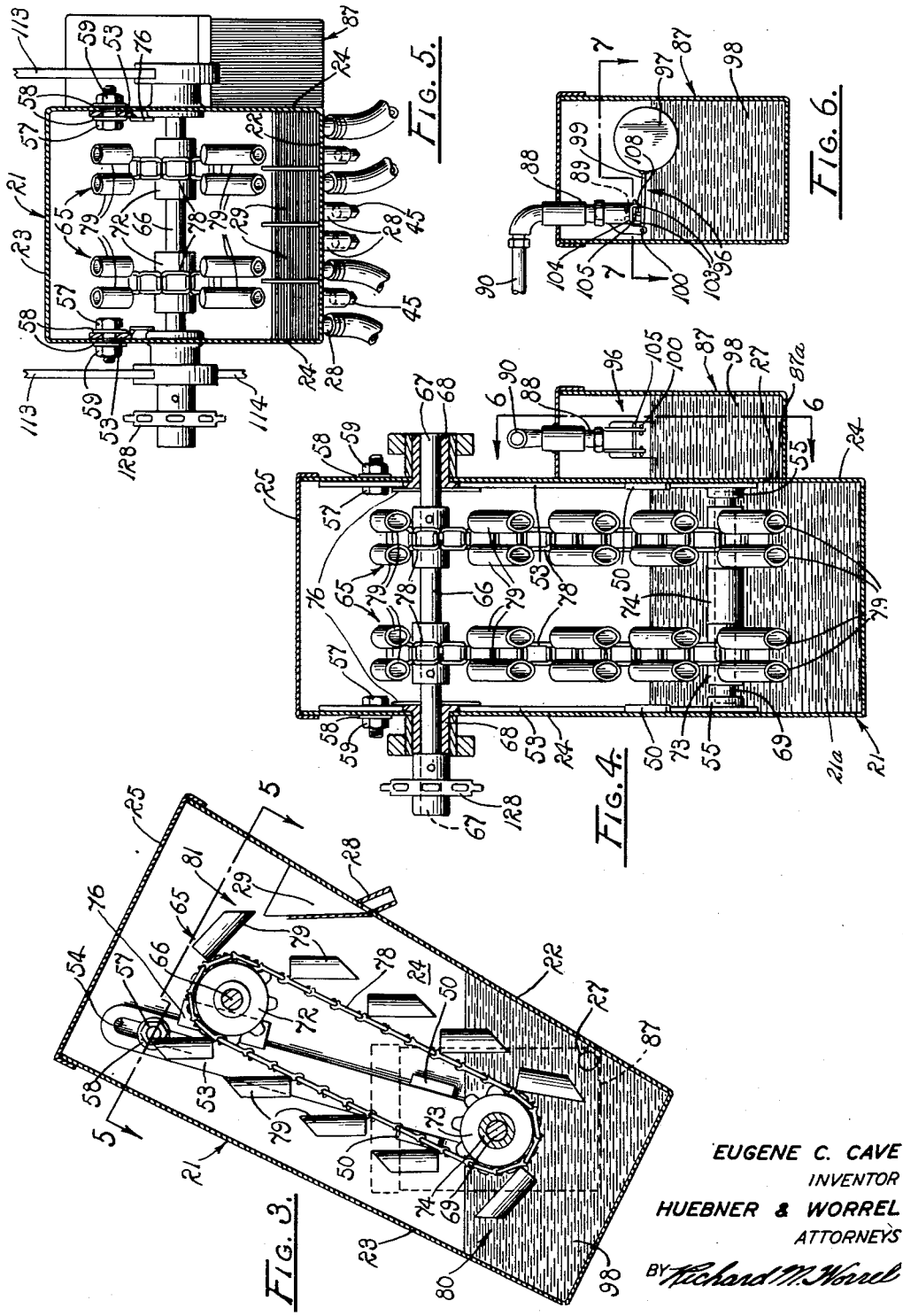

United States Patent Office 3,003,664
Patented Oct. 10, 1961

3,003,664
MATERIAL APPLYING IMPLEMENT
Eugene C. Cave, Rte. 4, Box 258, Bakersfield, Calif.
Filed June 1, 1959, Ser. No. 817,317
8 Claims. (Cl. 222—67)

The present invention relates to a material applying implement and more particularly to an implement for substantially uniformly applying flowable treating materials to the soil.

It is well-known that various liquids are applied to agricultural lands for conditioning the soil or inhibiting or killing weeds and/or insects. As examples of such liquids, there are liquid urea, aqua ammonia and phosphoric acid, all utilized as fertilizers, and DD and nemagon, both employed for their fumigating effect.

Conventionally, such liquids are injected under pressure through tubes extended into the ground and carried by a tool bar of a tractor. A supply of such liquid is mounted on the tractor, or other part of the supporting frame, and a pump forces liquid from the supply out through orifices in the injecting tube. This apparatus has been unsatisfactory because it does not apply or meter the fluid evenly to the soil as the apparatus is traveled over the ground. This is especially true if the tractor does not travel at a uniform speed. Also, it has been found that the described apparatus causes the orifices in the injecting tube to plug relatively frequently thereby requiring constant cleaning and maintenance.

Accordingly, it is an object of the present invention to apply treating materials substantially uniformly to the soil.

Another object is to enable treating materials to be applied more efficiently and effectively.

Another object is to minimize the time, labor and expense in applying fertilizers, fumigants and other materials to the soil.

Another object is to meter the application of such materials during travel over the soil so that they are applied substantially uniformly per lineal unit of travel notwithstanding variations in speed of travel.

Another object is to provide such an apparatus which is dependable in action and easy to operate and to maintain.

Another object is to provide an implement of the type described which is adapted for use in applying materials over one or several rows of a field.

Another object is to provide an implement of the type described which is adapted for use on level or uneven terrain.

Another object is to provide such an implement which can be elevationally adjusted for transportation from place to place, as along highways, and the like.

Another object is to provide a float valve especially adapted for use with an implement of the type described.

These, together with other objects, will become more fully apparent upon reference to the following description and accompanying drawings.

In the drawings:

FIG. 1 is a side elevation of an implement embodying the principles of the present invention and coupled to a tractor which is fragmentarily illustrated. An elevationally adjusted position of the implement is illustrated in dashed lines.

FIG. 2 is a top plan view of the implement and tractor of FIG. 1.

FIG. 3 is a somewhat enlarged transverse section taken on line 3—3 of FIG. 2.

FIG. 4 is a somewhat enlarged transverse section taken on line 4—4 of FIG. 1.

FIG. 5 is a somewhat enlarged transverse section taken on a plane at a position indicated by line 5—5 of FIG. 3.

FIG. 6 is a transverse section taken on a plane at a position represented by line 6—6 of FIG. 4.

FIG. 7 is a transverse section taken on a plane at a position indicated by line 7—7 of FIG. 6.

Referring more particularly to the drawings. a tractor 10 is fragmentarily illustrated in FIG. 1 and includes rear wheels 11. A pair of transversely spaced, rearwardly extended lift arms 12 are mounted on the tractor for elevational adjustable movement about a substantially horizontal, transversely extended, forward axis 13. This axis is normal to the forward direction of travel of the tractor. An elongated tool bar 15 is rigidly mounted on the arms in rearwardly spaced, parallel relation to the forward axis.

An implement embodying the principles of the present invention is generally indicated by the numeral 20 in FIGS. 1 and 2. The implement includes a main tank 21 having front and rear walls 22 and 23, respectively, and side walls 24 interconnected with the front and rear walls in substantially rectangular relation. The tank also includes a cover 25 releasably fitted on the front, rear and side walls. One of the side walls provides a lower inlet port 27, best seen in FIGS. 1 and 3, opening into an otherwise liquid-tight compartment 21a in the bottom of the tank. The front wall has a plurality of upper outlet ports 28 in transversely spaced relation to each other, and a plurality of outlet hoppers 29 are mounted within the tank on the front wall in upwardly disposed position and with each hopper in communication with a pair of adjacent outlet ports, all as best illustrated in FIG. 5.

As best seen in FIG. 1, the main tank 21 is rigidly mounted in upright, slightly forwardly inclined position on the tool bar 15 by means of a support beam 35 connected to the tool bar by a clamp 36 and rigidly connected to the front wall 22 of the tank. It is also to be observed in FIG. 2 that the tank is located substantially centrally of the tool bar.

A plurality of mounting shanks 40 are connected to the tool bar 15 in transversely spaced relation by means of clamps 41, and these shanks extend downwardly from the tool bar into earth penetrating engagement. Injection tubes 42 having outlet orifices 43 therein are rigidly connected to the rearward sides of the shanks and also penetrate the earth behind the shanks. Elongated flexible hoses 44 interconnect the injection tubes and selected outlet ports 28 of the tank 21. Those outlet ports which are not being employed, that is, which do not have a hose connecting them to injection tubes, are closed by means of releasable plugs 45.

Referring particularly to FIG. 3, lower guide blocks 50 are rigidly connected to the side walls 24 in spaced relation to each other. Elongated conveyer side plates 53 are individually longitudinally slidably fitted between the lower guide blocks for longitudinal adjustment relative to the side walls. Each of the side plates has an upper elongated, longitudinally extended slot 54, and a lower inwardly disposed bearing 55. Elongated bolts 57 are individually extended through the side walls of the tank and the slots of the side plates, and washers 58 and nuts 59 are fitted over and screw-threaded to the bolts. Therefore it will be evident that the plates can be held in selected positions within the tank. The plates are adjusted so that the bearings 55 are in coaxial alignment.

Material conveyers, generally indicated by the numeral 65, are mounted within the tank 21 and include an upper shaft 66 having opposite ends 67 individually journaled in bearings 68 mounted in the side walls 24 of the tank 21. Further, a lower shaft 69 is journaled in the bearings 55. These shafts are parallel to each other and to the forward axis 13 about which the arms 12 pivot. The upper shaft thus defines a rear axis with respect to the forward axis. Each conveyer also includes an upper sprocket 72 rigidly connected to the upper shaft and a lower sprocket 73 mounted on the lower shaft. A spacer sleeve 74 circumscribes the lower shaft and maintains the lower sprockets in predetermined transversely spaced relation to each other. This also maintains the lower sprockets in substantially the same vertical planes as their corresponding upper sprockets. Bearing holders 76 are secured to the side plates and engage the bearings 68 releasably to hold the same in place.

The conveyers include elongated endless flexible chains 78 individually extended around and in mesh with their upper and lower sprockets 72 and 73. A plurality of pairs of tubular recepticles 79, having closed inner ends and beveled outer ends, are connected to the conveyer chains in longitudinally spaced relation therealong. It will be evident that longitudinal adjustment of the side plates 53 effects tightening or loosening of the conveyer chains. Further, it will be evident that the conveyer chains move the receptacles in circuitous paths of travel successively through a lower liquid receiving station 80 adjacent to the inlet port 27 of the tank 21, thence upwardly through an upper material discharging station 81 above the outlet hoppers 29 wherein the receptacles are inverted for dumping their contents into the hoppers, and thence downwardly for return to the receiving station. There are four rows of receptacles and each such row feeds into a separate hopper, as seen in FIG. 5. There are preferably the same number of receptacles on each chain and preferably the receptacles are substantially equally spaced along the chains.

A supply reservoir 86, having an outlet 86a, is mounted on the tractor 10 and is adapted to contain a supply of treating liquid, such as a fumigant or a fertilizer. A float reservoir 87 is rigidly mounted on the side wall 24 of the tank 21 in which the inlet port 27 is located and provides an outlet 87a connected to and in precise registration with the inlet port. A conduit 88 is extended downwardly into the float reservoir and provides a downwardly directed inlet orifice 89 above the outlet 87a but below the outlet 86a of the supply reservoir, as illustrated in FIG. 1. An elongated flexible hose 90 interconnects the conduit 88 and the supply reservoir 86 whereby liquid from the reservoir is supplied to the float reservoir.

With particular reference to FIGS. 6 and 7, a float valve 96 includes a float 97 buoyed on liquid 98 in the float reservoir. A bracket 99 is mounted on the conduit 88 for elevational pivotal movement about a substantially horizontal axis 100. The bracket is rigidly connected to the float for elevational movement incident to rise and fall of the float with the liquid in the float reservoir 87.

A plurality of fingers 103 are rigidly upwardly extended from the bracket 99 in rectangular or other polygonal formation, and elongated rods 104 interconnect adjacent fingers so that the rods are in substantially parallel spaced relation to each other and to the bracket. A rectangular valve plate 105 has corners 106 and is supported by the bracket so that corners are fitted between adjacent fingers. Further, the plate is captured against appreciable edgeward movement by means of the fingers, the bracket, and the rods. It is to be noted that the plate has the same shape as the polygonal formation of the fingers. A bar 108 is rigidly connected to the bracket beneath the valve plate for a purpose to be described. The valve plate is adapted to be moved between a seated position in fluid-tight engagement with the conduit 88 over the orifice 89 incident to upward movement of the bracket and a retracted position in downwardly spaced relation to the orifice incident to downward movement of the bracket. In the seated position, the bar urges the plate upwardly into tight contact with the conduits.

An elongated frame 112 includes a pair of transversely spaced, substantially parallel forward arms 113 extended on opposite sides of the main tank 21 and rotatably journaled or fulcrummed on the upper conveyer shaft 66 outside of the tank. One of these forward arms has a forwardly extended end portion 114 to which subsequent reference will be made. The frame also includes a pair of rearwardly extended, transversely spaced, substantially parallel arms 116. Struts 117 rigidly interconnect the arms. Bearings 118 are mounted in the rearwardly extended arms in coaxial relation.

A drive shaft or rear axle 125 is journaled in the rear bearings 118 and has a laterally extended end 126. A drive sprocket 127 is rigidly connected to this end of the drive shaft. Also, a driven sprocket 128 is rigidly connected to an outwardly extended end of the upper conveyer shaft 66 and in substantially the same vertical plane as the drive sprocket. It is also to be noted that the drive and driven sprockets are of preferably substantially the same diameter. An elongated flexible endless drive chain 130 extends around and is in mesh with the drive and driven sprockets. A drive wheel 132 is rigidly mounted on the drive shaft 125 between the rearwardly extended arms 116 of the frame 112. A plurality of cleats 133 are provided on the wheel in circumferentially spaced relation thereabout. The drive wheel is thus positioned in rearwardly spaced relation to the tank 21 and is adapted for rotatable engagement with the ground over which the tractor 10 is motivated. Further, a flexible elevational control chain 135 interconnects the end portion 114 of the frame 112 and the tractor 10, preferably at a position 136 below the lift arms 12, and limits counterclockwise pivoting of the frame on the shaft 66, as viewed in FIG. 1.

*Operation*

The operation of the described embodiment of the subject invention is believed to be readily apparent and is briefly summarized at this point. Before placing the subject implement into operation, the shanks 40 are transversely adjusted on the tool bar 15 depending upon the areas of the soil which it is desired to treat. It may be necessary to employ more than the four shanks illustrated, or, alternatively, less than four shanks may be employed. Depending upon the number of shanks utilized, therefore, flexible hoses 44 interconnect the injection tubes 42 employed and selected outlet ports 28 of the tank 21. Those outlet ports which are not used are closed by means of the plugs 45.

The lift arms 12 are lowered so as to lower the tank 21 and correspondingly to lower the drive wheel 132 into ground engagement. This extends the shanks 40 and the injection tubes 42 into earth penetrating engagement. The tractor 10 is driven forwardly and treating liquid from the supply reservoir 86 is allowed to gravitate through the hose 90 into the float reservoir 87 where it is metered into the tank 21 by means of the float valve 96. Of course, the level of the fluid in the tank remains the same as the level of the fluid in the float reservoir 87.

As the implement travels over the ground, the drive wheel 132 is rotated thereby to motivate the drive chain 130 and to motivate the conveyer chains 78 through the driven sprocket 128 and the upper conveyor shaft 66. The receptacles 79 are thus motivated from the receiving station 80 where they scoop up individual amounts of liquid and carry the same upwardly to the discharging station 81 where such liquid is dumped into the outlet hopper 29. Those outlet ports 28 which are unplugged and connected to hoses 44 conduct this fluid downwardly into the injection tubes 42 and thence through the orifices 43 into the soil.

If the tractor 10 is driven at a higher rate of speed so as to traverse the earth more rapidly, the drive wheel 132 is driven at a greater speed so as to motivate the receptacles 79 along their paths at a greater speed and to discharge a greater volume of liquid per unit of time. In this manner, the amount of liquid deposited on the soil per lineal foot of earth traversed remains substantially constant. In a similar way, if the tractor is slowed down in speed, the drive wheel turns slower and thereby the receptacles travel along their paths at a slower rate of speed. Accordingly, it will be evident that the drive wheel maintains the amount of liquid applied to the soil substantially uniform.

It is also to be observed that the drive wheel 132 is elevationally movable above its fixed lowermost position and relative to the tank 21 by means of its mounting on the frame 112. Accordingly, the wheel rises and falls incident to movement of the implement over uneven terrain so as to maintain its driving contact with the ground when the shank penetrates the earth.

When it is no longer desired to apply treating material to the soil with the subject implement 20, the arms 12 are elevated thereby to raise the tank 21 and to stop gravity feed of liquid from the supply reservoir 86 into the float reservoir 87. This elevational movement of the tank also raises the drive wheel 132, as indicated in dashed lines in FIG. 1. It will be evident that the connection of the forward end portion 114 of the frame 112 prevents elevational movement of this end portion and causes elevational movement of the drive wheel whenever the tank or the upper shaft 66, to which the frame is connected, is moved upwardly. Thus, not only is the supply of fluid to the tank stopped but also the movement of the receptacles 79 is prevented so that no liquid is discharged from the tank into the hoses 44. It is also desirable to elevate the drive wheel in this manner when passing over relatively large obstructions.

From the foregoing it will be evident that an implement has been provided for use in applying flowable treating materials in a substantially uniform manner onto the soil. The implement utilizes a ground driven wheel so as to meter discharge of treating material in accordance with the speed of travel of the implement over the ground. In this manner, substantially the same amount of material is applied per lineal unit of travel regardless of the speed of travel of the implement. Further, the implement is relatively simply and quickly placed into and out of operation by elevationally adjusting the implement. It has been found in practice that the subject implement is highly effective for applying such liquid fertilizers as liquid urea, aqua ammonia, and phosphoric acid and such fumigating liquids as DD and nemagon.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In an implement for applying liquid substantially uniformly to the soil; a support; means mounting the support for earth traversing movement; a liquid supply reservoir borne by the support and having an outlet; a liquid tank mounted on the support having an upper outlet adapted to guide liquid from the tank for application to the soil, and a lower inlet; a float reservoir mounted on the tank having an inlet below the outlet of the supply reservoir and an outlet below the inlet of the float reservoir and in fluid communication with the inlet of the tank; a hose interconnecting the outlet of the supply reservoir and the inlet of the float reservoir for gravitational flow of liquid from the supply reservoir into the float reservoir; a float valve in the float reservoir and connected to the inlet thereof for opening and closing the same to maintain a predetermined level of liquid in the float reservoir and therefore the tank; a liquid receptacle; means mounting the receptacle in the tank for travel in a circuitous path through a liquid receiving station adjacent to said lower inlet wherein the receptacle is immersed in liquid in the tank and a liquid discarging station adjacent to the outlet for discharging such received liquid into the outlet; a drive wheel borne by the support and rotatably engageable with the earth over which the support is traveled; and linkage means interconnecting the wheel and the receptacle mounting means for varying the speed of movement of the receptacle along its path in accordance with the speed of travel of the support relative to the earth over which the support is traveled whereby the amount of liquid discharged corresponds to such speed of travel and whereby the amount of liquid applied to the soil per lineal unit of travel of the support is maintained substantially constant.

2. The implement of claim 1 wherein the outlet of the tank includes an outlet hopper adapted to receive material from the receptacle and a pair of outlet ports; including liquid conducting means connected to one of the outlet ports for discharging material from the hopper onto the soil; and including a plug releasably closing the other outlet port.

3. In combination with a prime mover adapted for forward earth traversing movement along a predetermined path of travel and having a rearwardly extended implement support elevationally adjustable about a substantially horizontal forward axis disposed transversely of said path of travel; an implement for applying fluid treating material to the soil over which the prime mover is traveled comprising an upright tank rigidly mounted on the support adapted to contain such treating material and having a lower treating material inlet and an upper treating material outlet, an elongated wheel mounting frame fulcrummed on the tank for elevational pivotal movement about a rear axis substantially parallel to said forward axis, the frame having end portions extended forwardly and rearwardly from said rear axis, means mounted in the tank for conveying treating material from adjacent to the inlet of the tank to the outlet thereof, a drive wheel mounted on the rearwardly extended end portion of the frame and engageable with the ground over which the prime mover is traveled, linkage means interconnecting the conveying means and the drive wheel for motivating the conveying means incident to rotation of the drive wheel, and means interconnecting the forwardly extended end portion of the frame and the prime mover for limiting upward movement of the forwardly extended end portion of the frame whereby the rearwardly extended end portion of the frame and the wheel are elevationally adjusted incident to elevational adjustment of the support.

4. The combination of claim 3 wherein said conveying means includes an elongated shaft coaxial with said rear axis and having opposite ends journaled in and extended transversely outwardly of the tank, and wherein the frame has a pair of forwardly extended transversely spaced arms on opposite sides of the tank and individually journaled on opposite ends of the shaft.

5. The combination of claim 3 including a material supply reservoir mounted on the prime mover, a float reservoir mounted on the tank and having fluid communication therewith, and a hose interconnecting the reservoirs, the float reservoir being movable with the frame incident to elevational adjustment of the drive wheel between positions above and below the supply reservoir for precluding and allowing gravity feed of such material from the supply reservoir to the float reservoir.

6. In a fluid reservoir, a conduit extended into the reservoir and providing a downwardly directed orifice, a float valve for controlling the admission of fluid into the reservoir through the conduit comprising a float adapted to be buoyed on fluid in the reservoir, a bracket rigidly connected to the float and supported on the conduit for pivotal movement upwardly and downwardly toward and away from the orifice incident to rise and fall of the fluid in the reservoir, guide fingers rigidly connected to the bracket and upwardly extended in spaced polygonal relation to each other, and a valve plate of substantially the same polygonal shape as the relationship of the fingers and rested on the bracket, the plate having corners individually positioned between adjacent fingers, the plate being larger than the orifice and being movable between a seated position in fluid-tight engagement with the conduit over the orifice when the bracket moves toward the orifice and an unseated position in spaced relation to the orifice when the bracket moves away from the orifice.

7. The valve of claim 6 wherein spaced rods rigidly interconnect adjacent fingers on opposite sides of the conduit and in spaced relation to the bracket whereby the plate is captured against appreciable edgeward movement by the bracket, the fingers, and the rods, and wherein a bar is rigidly mounted on the bracket beneath the plate for bearing upwardly against the plate to urge the plate against the conduit in said seated position.

8. In combination with a prime mover adapted for forward earth traversing movement along a predetermined path of travel and having a rearwardly extended implement support elevationally adjustable about a substantially horizontal forward axis disposed transversely of said path of travel; an implement for applying flowable treating material to the soil over which the prime mover is traveled comprising a tank mounted on the support adapted to contain such treating material and having an upper treating material outlet, an elongated wheel mounting member fulcrummed on the tank for elevational pivotal movement about a rear axis substantially parallel to said forward axis, said wheel mounting member having end portions extended forwardly and rearwardly from said rear axis, means mounted in the tank for conveying treating material therein to said outlet, a drive wheel mounted on the rearwardly extended end portion of the wheel mounting member and engageable with the ground over which the prime mover is traveled, linkage means interconnecting the conveying means and the drive wheel for motivating the conveying means incident to rotation of the drive wheel, and means interconnecting the forwardly extended end portion of the wheel mounting member and the prime mover for limiting upward movement of the forwardly extended end portion of the mounting member whereby the rearwardly extended end portion of the mounting member and the wheel are elevationally adjusted incident to elevational adjustment of the support.

References Cited in the file of this patent

UNITED STATES PATENTS

| | | |
|---|---|---|
| 1,469,293 | Cramer | Oct. 2, 1923 |
| 2,612,294 | Dorschner | Sept. 30, 1952 |
| 2,655,292 | Trump | Oct. 13, 1953 |